(12) United States Patent
Schwartzkopf (10) Patent No.: US 6,638,422 B1
(45) Date of Patent: Oct. 28, 2003

(54) LIQUID FILTRATION APPARATUS AND METHOD EMBODYING FILTRATION PARTICLES HAVING SPECIFIC GRAVITY LESS THAN LIQUID BEING FILTERED

(76) Inventor: Steven H. Schwartzkopf, 19825 Kane Ct., Saratoga, CA (US) 95070

( * ) Notice: Subject to any disclaimer, the term of this patent is extended or adjusted under 35 U.S.C. 154(b) by 0 days.

(21) Appl. No.: 09/433,910

(22) Filed: Nov. 3, 1999

(51) Int. Cl.$^7$ .................................................. C02F 1/32
(52) U.S. Cl. ...................... 210/108; 210/110; 210/143; 210/192; 210/203; 210/253; 210/277; 210/284
(58) Field of Search ................................ 210/108, 120, 210/109, 110, 143, 192, 203, 253, 275, 277, 284

(56) References Cited

U.S. PATENT DOCUMENTS

| | | | | |
|---|---|---|---|---|
| 3,067,358 A | | 12/1962 | DeMaine | 313/231 |
| 3,469,057 A | | 9/1969 | Maines | 219/69 |
| 3,678,240 A | | 7/1972 | Dietrick | 219/69 D |
| 3,709,362 A | * | 1/1973 | Lindstol | 210/108 |
| 3,962,557 A | | 6/1976 | Buck | 219/69 D |
| 4,052,300 A | * | 10/1977 | Mosso | 210/20 |
| 4,198,301 A | * | 4/1980 | Iwatani | 210/274 |
| 4,383,920 A | * | 5/1983 | Muller et al. | 210/87 |
| 4,387,286 A | | 6/1983 | Inoue | 219/69 D |
| 4,415,454 A | * | 11/1983 | Fuchs | 210/616 |
| 4,417,962 A | | 11/1983 | Inoue | 204/129.46 |
| 4,608,181 A | * | 8/1986 | Hsiung et al. | 210/786 |
| 4,743,382 A | * | 5/1988 | Williamson et al. | 210/786 |
| 4,839,488 A | | 6/1989 | Katoh et al. | 210/510.1 |
| 4,865,734 A | * | 9/1989 | Schulz | 210/279 |
| 4,885,083 A | * | 12/1989 | Banks | 210/108 |
| 4,952,767 A | | 8/1990 | Uemoto et al. | 219/69.11 |
| 4,963,257 A | * | 10/1990 | Schulz | 210/279 |
| 5,030,353 A | * | 7/1991 | Stuth | 210/615 |
| 5,122,287 A | * | 6/1992 | Hsiung | 120/792 |
| 5,126,042 A | * | 6/1992 | Malone | 210/150 |
| 5,178,772 A | * | 1/1993 | Daley et al. | 210/721 |
| 5,217,607 A | * | 6/1993 | Dalton et al. | 210/143 |
| 5,227,051 A | * | 7/1993 | Oshima | 210/137 |
| 5,232,586 A | * | 8/1993 | Malone | 210/151 |
| 5,386,094 A | | 1/1995 | Kawai et al. | 219/69.14 |
| 5,434,381 A | | 7/1995 | Mitcheson | 210/195.2 |
| 5,573,663 A | * | 11/1996 | Junius et al. | 210/189 |
| 5,747,311 A | * | 5/1998 | Jewell | 435/176 |
| 5,770,080 A | * | 6/1998 | Malone | 210/618 |
| 5,833,867 A | * | 11/1998 | Hensley | 210/792 |
| 5,932,092 A | * | 8/1999 | Hawk et al. | 210/169 |
| 5,945,005 A | * | 8/1999 | Junius et al. | 210/786 |
| 6,015,497 A | * | 1/2000 | Steen | 210/618 |

\* cited by examiner

Primary Examiner—Peter A. Hruskoci
(74) Attorney, Agent, or Firm—John J. Leavitt (57) ABSTRACT

A liquid filtering apparatus which incorporates a filter bed medium having a specific gravity lower than that of the process liquid being filtered. Process liquid is pumped through one or more filter chambers containing the filter bed medium. A discharge line at the top of the housing directs the filtered liquid either back into a process liquid tank or stream, or into a clean liquid storage tank. A small storage tank provides a volume of filtered liquid for use in backwashing the filter bed medium. The particle size and nature of the filter bed medium are determined by the identity and specific gravity of the process liquid to be filtered so that the filter bed is buoyant on the process liquid. As the process liquid is pumped into the filter chamber, the composite filter bed floats to the top of the chamber where it stops rising. The process liquid then passes through the filter bed and the particulates are strained from the liquid by surface filtration and depth filtration. The apparatus includes a backwash pump, a single or plurality of backwash nozzles, a backwash valve, and a backwash waste liquid and particulate collection reservoir. During the backwash cycle, stored cleaned process fluid is withdrawn from the backwash reservoir by the backwash pump and forced through the backwash spray nozzle(s).

4 Claims, 7 Drawing Sheets

LIQUID FILTRATION APPARATUS AND METHOD EMBODYING FILTRATION PARTICLES HAVING SPECIFIC GRAVITY LESS THAN LIQUID BEING FILTERED

BACKGROUND OF THE INVENTION

1. Field of the Invention

The present invention relates to an apparatus and method for filtering particulates of various sizes from miscellaneous process liquids, and more particularly to an apparatus and method that utilizes a filtration bed formed from particles having a specific gravity lower than that of the liquid being filtered.

2. Description of the Prior Art

A preliminary patentability and novelty search regarding the invention described herein has revealed the existence of the following U.S. Pat. Nos.:

3,067,358
3,469,057
3,678,240
3,962,557
4,387,286
4,417,962
4,839,488
4,952,767
5,434,381
5,386,094

A careful review of the patents noted above has failed to reveal the concept, apparatus and method disclosed herein.

The need to remove particulates, whether contaminants or products, from process liquids is common to a wide range of processes. One such process is the necessity to filter metal particles from the solution used during electrical discharge machining. In the following description, the focus will be on the removal of particulate contaminants from such a solution, however, the same mechanisms can be applied to the filtration and harvesting of particulate materials which form the product(s) of a process. Although a variety of methods have been developed to remove particulates from such process liquids, the most popular method is media filtration. In media filtration, particulate contaminants are strained from the process liquid in one of two ways, either by pumping the contaminated liquid through a unitary permeable element, or by pumping the liquid through a filter bed which is itself composed of small particles.

In permeable unitary element filtration, the liquid is pumped through an element which has pores or channels that allow the liquid to pass through the element but prevent the passage of particulates larger than the pore/channel diameter. Permeable elements comprise a variety of materials, including fabric, paper, ceramic, metal and plastic. These elements filter the liquid primarily by capturing the contaminant particles on the surface of the element, thus building up a crust or layer of contaminants on the surface. As contaminants accumulate on the surface of the element, liquid flow through the permeable element is reduced because the crust or layer of contaminants acts as an obstruction and because an increasing number of the pores or channels become blocked. As the percentage of blocked pores or channels increases and the crust or layer of contaminants becomes thicker, the pressure required to maintain a specific rate of flow of liquid through the permeable element increases. Eventually, the pressure required exceeds the capability of the pump, or some other system component, and the contaminated element must be replaced with a new element in order to maintain the desired performance of the filtration system.

Alternatively, an attempt may be made to clean the filter element by backwashing it with clean liquid or air to remove the contaminant accumulated on the surface. However, even when the contaminant accumulation on the surface of such an element is removed by backwashing, there are usually contamination particles that remain lodged in the permeable element that backwashing is not totally successful in removing. Ultimately, the element must either be replaced with a new element or cleaned in a more rigorous fashion, i.e., by immersion in an acid or base solution to dissolve the contaminants. The more frequently such stringent cleaning or element replacement must be performed, the more costly this filtration process becomes.

In contrast, the second type of media filtration, namely, bed filtration, uses a filter bed composed of small particles such as sand or diatomaceous earth, and is one of the most common conventional methods of removing particulate contaminants from liquids. The sand filter uses sand particles that are about 0.35 mm in diameter and fairly uniform in size. Diatomaceous earth filters use a siliceous material formed from the skeletons of small (about 100 microns in diameter) marine algal cells called diatoms. Nominally, in a conventional bed filter, the process fluid is pumped, or allowed to flow via gravity, downward through a column, or bed, of material. This column may range from approximately one foot to several feet in thickness. As the particulate-laden liquid passes through the bed, the particulates are strained from the liquid and the cleaned liquid exits at the bottom of the bed.

The bed filter removes the particulate contaminants via one of two processes. First, the larger particulates, which are unable to pass through the spaces between the bed grains, are trapped at the top surface of the bed. This straining effect produces a layer, or crust (also called a cake), of large contaminant particles, which builds up on the surface of the bed, a mechanism called surface filtration. This cake can actually enhance the performance of the filter bed by helping to capture more contaminant particulates, which are retained in the crust itself because they cannot pass through the spaces between the contaminant particles which form the crust.

Second, smaller particulates which are carried into the bed by the fluid flow are intercepted by the bed's grains as they follow the convoluted flow pathways taken by fluid as it passes through the bed, a process called depth filtration. Although smaller particulates are captured in the bed material, the smallest particulates are not captured, as they continue to flow through the bed and exit with the semi-cleaned liquids at the bottom of the filter bed.

Ultimately, the particulates sequestered by the bed accumulate, making it more difficult for liquid to flow downward through the bed, and thus the flow rate declines. The pressure required to force liquid through the bed then increases, and presents an excellent indication of the growing need to cleanse the bed of the accumulated particulates. Cleansing is achieved by a process of backwashing or backflushing.

During backwashing, clean fluid is vigorously pumped upwards from the bottom of the particulate bed. This upflow of liquid causes the bed to expand slightly, freeing the captured particulates and washing them upwards and out of the bed. As the bed expands, the bed particles have less interference with each other and thus settle faster, matching the upflow rate of the liquid. This effect prevents the bed particles from being washed out of the bed along with the contaminant particulates. Typical backwash conditions are five to fifteen minutes duration with the bed volume expanded 15 to 30%.

Although sand and diatomaceous earth filters have been successfully applied to a wide variety of filtration problems, they have a number of limitations and drawbacks. For example, one of the most serious problems involves bed homogeneity. Non-homogeneous beds, for example, develop cracks that offer regions of less flow resistance in the bed. These cracks then typically enlarge and lead to the formation of channels in the bed, in turn causing poor distribution of the liquid flow through the bed, and thus very low particulate removal. Air may also be trapped in the bed, also leading to the formation of channels and poor distribution of the liquid.

In addition, the size and cleanliness of the bed particles are extremely important to the success of the filtration process; a bed composed of large particles allows significant numbers of small particulates to pass through the filter bed along with the filtered fluid. On the other hand, beds composed of smaller particles can become clogged with extremely small particulates, rapidly rendering the filter bed ineffective. Sand also adsorbs organic compounds on which microorganisms can feed. The highest nutrient concentration is on the surface of the sand granules, so that is where the microorganisms grow. This microbial growth clogs filters and shortens the time interval until cleaning is required Finally, large volumes of clean liquid are required to backwash and clean conventional filter beds, leading to large volumes of contaminated liquid which must be treated or properly disposed. Although backwashing is fairly effective for removing the particulates that are captured by the filter, some particulates may adhere so strongly to the bed particles that they are virtually impossible to remove, and the resulting loss in filter efficiency significantly impairs filter performance. Additionally, the specific gravity of the contaminant particulates is often equal to or greater than the specific gravity of the bed particles which make up the filter bed. In such circumstances, it is especially difficult to separate the heavy contaminant particles from the bed particles through a backwash process, and backwashing is therefore not effective as a cleaning method. In such situations, the contaminated bed must ultimately be replaced with new bed material.

In view of the above disadvantages with conventional filtration apparatuses and methods, it is the principal object of the present invention to overcome the above-discussed disadvantages associated with prior media fluid filtration systems.

Another object of the present invention is to provide a new and improved filtering system for the removal of particulate contaminants from process liquids which incorporates a high-efficiency backwashable filter bed.

A still further object of the invention is to provide a liquid filtration apparatus and method that embodies a filtration bed that floats on the liquid to be filtered.

Yet another object of the invention is to provide a liquid filtration apparatus and method that embodies a filtration bed formed from particles having a specific gravity substantially less than the liquid being filtered.

A still further object of the invention is the provision of a filtration apparatus and method that precipitates dissolved metals in a liquid process stream and then filters such precipitated metals from the liquid stream.

Yet another object of the invention is the provision of a liquid filtration apparatus and method that in one aspect incorporates a pair of filtration housings connected in parallel.

A still further object of the invention is the provision of a liquid filtration apparatus and method that in another aspect incorporates a pair of filtration housings connected in series.

The invention includes other objects and features of advantage, some of which, with the foregoing, will be apparent from the following description and the drawings. It is to be understood that the invention is not limited to the embodiments illustrated and described, since it may be embodied in various forms within the scope of the appended claims.

SUMMARY OF THE INVENTION

The invention disclosed herein overcomes the disadvantages encountered with prior bed filtration systems by providing a filtering apparatus which incorporates a bed medium with a specific gravity substantially lower than that of the liquid being filtered. During operation, the liquid to be filtered is withdrawn from a process tank or process stream and pumped under pressure through one or more filter housings containing the aforementioned bed medium. The liquid being filtered is pumped into the housing at the bottom, elevates the filter bed by floatation to a position where further elevation is restrained and then rises through the restrained bed medium, exiting the filter housing at the top.

A valve in the exit line at the top of the housing directs the filtered liquid either back into the process tank or stream, or into a clean fluid storage tank. A small storage tank in the filtration system provides a volume of filtered liquid for use in backwashing the filter bed medium to clean it by removing the particulates it strains from the process liquid. A valve in the entry line is closed when the backwash is performed to prevent backflow of contaminated liquid into the process stream. A second valve, in the exit drain line, is opened to direct the "dirty" liquid into a storage chamber where it is collected until it can be properly disposed or recycled.

In one aspect thereof, the present invention is directed to an apparatus for filtering particulate contaminants from contaminated liquid process streams, such as, by way of example, from the cooling solution used during electrical discharge machining. The apparatus includes a primary pump with a liquid inlet from the process stream or process storage tank and a liquid outlet to the filter housing a chamber. The filter chamber includes a liquid inlet from the primary pump and a liquid outlet which returns the filtered liquid to the process stream or to a clean process fluid reservoir. The filter chamber contains the filter bed which acts as a strainer to remove the particulates from the process stream.

In another aspect, the present invention is directed to a liquid filtration apparatus that includes a filter bed composed of a particulate medium that has a substantially lower specific gravity than that of the process liquid to be filtered. The particle size and nature of this bed medium are determined by the identity of the process liquid to be filtered. As the process liquid is pumped through this filter bed, the particulate contaminants are strained from the liquid by one or both of the aforementioned methods.

In a third aspect thereof, the present invention is directed to a liquid filtration apparatus that includes a backwash system that incorporates a backwash reservoir to store cleaned process fluid for backwashing, a backwash pump, a single or plurality of backwash nozzles, a backwash valve, and a backwash waste liquid/particulate collection reservoir. During the backwash cycle, stored cleaned process liquid is withdrawn from the backwash reservoir by the backwash pump and forced through the spray nozzle(s). This backwash spray, in conjunction with alternately opening and closing of the backwash valve at the bottom of the filter chamber, serves to efficiently clean the strained particulates from the bed and wash them into the waste liquid/particulate collection reservoir.

The above-mentioned and other features and objects of the invention and the manner of obtaining them will become apparent and the invention will be better understood by reference to the following description of preferred embodiments of the invention taken in conjunction with the accompanying drawings.

Corresponding reference characters indicate corresponding parts throughout the several views of the drawings. The exemplifications herein illustrate preferred embodiments of the invention in specific forms thereof, and such exemplifications are not to be construed as limiting the scope of the disclosure or the scope of the invention as set forth in the appended claims.

DESCRIPTION OF THE PREFERRED EMBODIMENTS

Figure 1:
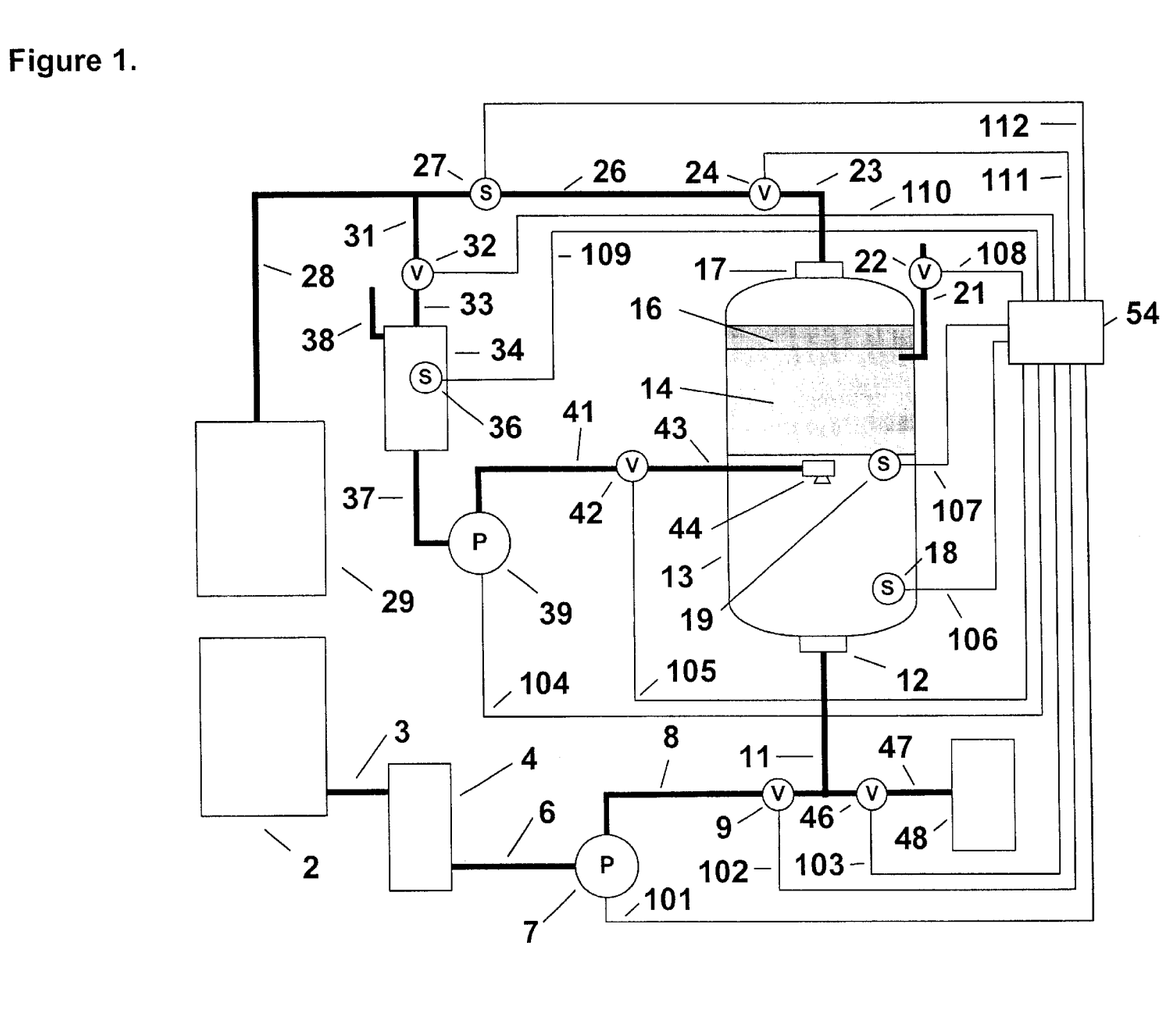
FIG. 1 is a diagrammatic view of the overall apparatus for filtering particulates from a process liquid according to the present invention.

Single Filter Housing Embodiment of FIG. 1.

In this embodiment, a central control system designated generally by the numeral 54 is used to monitor the sensors installed in the filtration system, and to turn "ON" and "OFF" all of the actuators (pumps and valves) required to operate the system. This control system may be operated either by manually actuated switches or by electronic switches activated by an embedded microprocessor. Although using a microprocessor makes the system somewhat more complex, it enables more efficient operation of the system as well as providing unattended operating capability during periods when no personnel are available to manually control the system.

During normal operation, the process liquid to be filtered is withdrawn from a reservoir 2, connected by a conduit 3, to a pump priming chamber 4. Alternatively, the liquid may also be withdrawn directly from a process liquid stream. Although not absolutely required, the use of the pump priming chamber 4 helps prolong the life of the primary liquid pump 7, by ensuring that the pump does not run "dry". Running "dry"(i.e., run without liquid in the pump head), may damage the pump. As the liquid is removed from the pump priming chamber 4, through a conduit 6 connecting the pump priming chamber to the primary fluid pump 7, a partial vacuum is created in the pump priming chamber 4 and thus in the conduit 3 connecting the reservoir 2 to the priming chamber 4. This vacuum pulls process liquid from the reservoir and establishes a supply flow of the process liquid to the primary pump 7. As the liquid exits the primary pump 7, it is pumped through a conduit 8 to a normally-open valve 9 and into a connecting conduit 11 which attaches to the filter housing 13 through the filter housing inlet 12. It should be understood that when valves are designated herein, such valves may be manually actuated or electronically actuated, and preferably the latter.

After passing through the filter housing inlet 12, the flowing liquid spreads out, and flows upwards through the filter housing 13, causing the filter bed 14, which floats on top of the liquid, to rise in the housing 13. The filter bed consists of small diameter particles having a specific gravity substantially lower than that of the liquid being filtered, and are selected to be within a specific size range, nominally having a diameter between 0.1 micron and 1.0 mm. The size and material composition of the filter bed particles, as well as the bed volume and filtration area, are determined by the process liquid filtration requirements, including the size and nature of the particulates to be removed from the process liquid. The particles which compose the filter bed are typically formed from plastic, glass or ceramic materials, but in any event these particles must have a specific gravity substantially less than that of the liquid being filtered.

As the process liquid flows into the filter housing 13, the level of the process liquid rises in the housing. The bed 14, which is floating on the rising process liquid, rises until it eventually touches the bed support 16 near the top of the filter housing. This support restrains the bed media, and prevents it both from rising any further in the housing and from flowing out of the filter housing along with the liquid being filtered. Although the filter bed itself is prevented from rising any further in the housing, the process liquid continues to rise and flows through the filter bed as it is pumped into the housing by the primary pump 7.

As the liquid level rises, the liquid is filtered as it flows upwards through the filter bed and then through the bed support and into the top of the filter housing. The bed support 16 thus also provides a final filtration barrier to the particulates carried in the liquid. The bed support is nominally formed from a multi-layer "sandwich" (FIG. 2), comprising a perforated metal plate 16(A), and two or more layers of screen 16(B) and 16(C). Alternatively, the "sandwich" may also comprise the aforementioned perforated metal plate with a single layer of screen, and a layer of semipermeable membrane or sintered permeable plastic or metal material.

Figure 2:
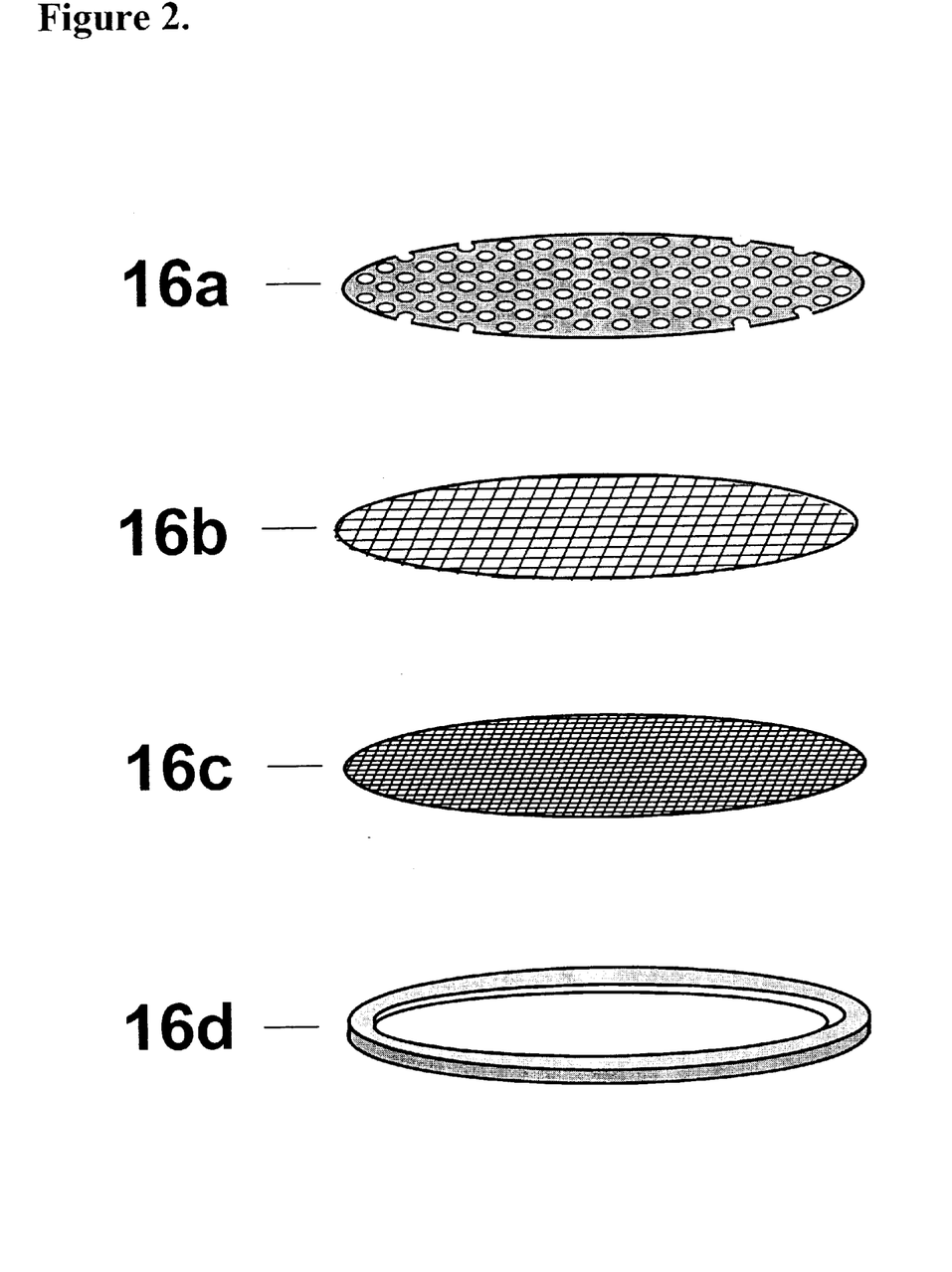
FIG. 2 is a diagrammatic view which presents a detailed view of the filter bed medium retaining plates for coarse and medium filter media (mean media particle diameter greater than 100 microns in diameter).
Figure 3:
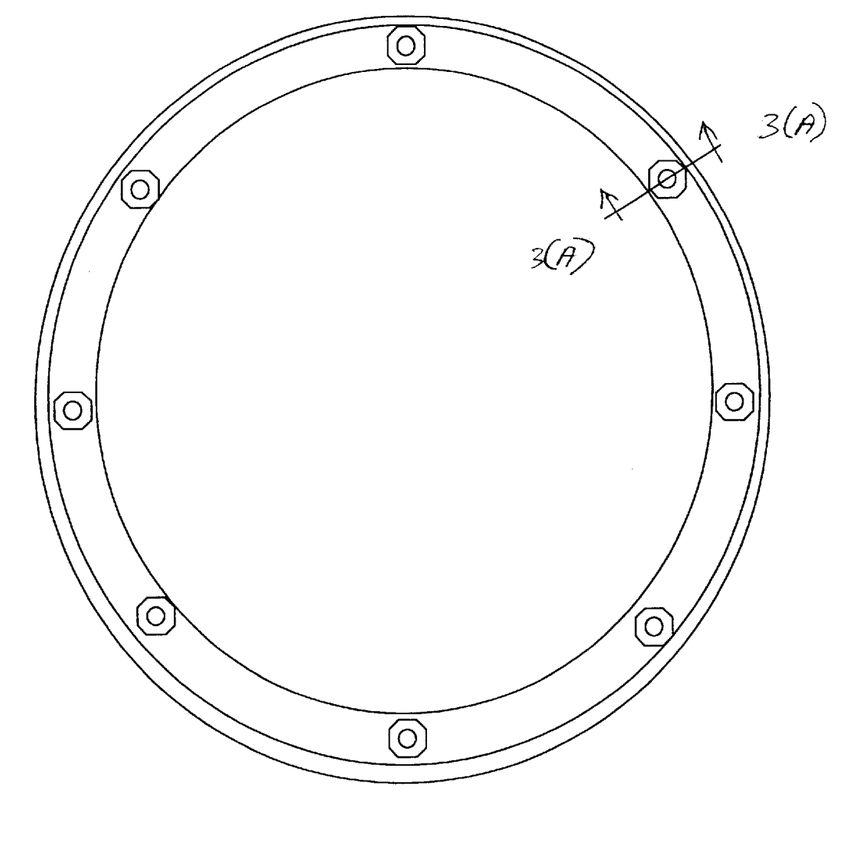
FIG. 3 is a diagrammatic view of the filter bed medium retaining plates for fine filter media (mean media particle diameter less than 100 microns in diameter).
Figure 3A:
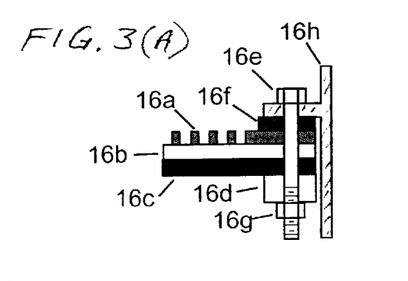
FIG. 3(A) is a vertical cross-sectional view taken in the plane indicated by the line 3(A)—3(A) in FIG. 3.

Selection of these constituent layers depends upon the size of the filter bed particles. The fine mesh screen or membrane layer is positioned at the lower face of the bed support 16 immediately next to the filter bed media. A medium mesh screen is positioned in the center to provide structural support for the fine layer, and the perforated metal is last and provides structural stiffening for the entire support assembly. The fine material, whether screen or permeable membrane, is preferably the layer which directly contacts the filter bed media. The other layers serve to provide structural support and enhance liquid flow through the bed support. This multiple layer design provides the strength necessary to retain the bed media under working filtration pressures which may encompass a range, for example, from 75 to 150 psi. A broader range may of course be utilized under appropriate conditions related to the type of media bed, the type and size of particulates sought to be filtered thereby and the optimum velocity flow of liquid through the system.

As the process liquid flows vertically upward through the filter bed 14, contaminant particles are retained by the filter bed through one of two different mechanisms. At the point where the process liquid flow first encounters the filter bed, surface filtration, the first mechanism, occurs. This mechanism occurs as the larger particulates are captured at the filter bed's lower surface, being unable to pass through the spaces between the particles which make up the filter bed as the liquid flows up through the filter bed. As these larger particulates are captured at the lower surface of the filter bed, they form a crust on that surface.

Flowing along with the process liquid, smaller particulates may be captured at the bottom surface of the filter, retained by the crust formed by the accumulation of larger particulates. Thus, this crust may by itself prevent the passage of some of the smaller particulates. Some of the smaller particulates may also pass through the crust on the filter bed's lower surface, penetrate the bed, and become trapped by the second mechanism, depth filtration. In this mechanism, these smaller particulates are captured and retained in the interstitial spaces in the filter bed between the filter media particles. The smallest particles, depending on their size, the size of the bed particles, and the size of the openings in the bed support, may actually flow through the bed and exit the filter housing through the housing exit port 17 along with the outflowing filtered process liquid.

After flowing through the filter bed support 16, the process liquid enters the top portion of the filter housing above the filter bed support structure and exits through the exit port 17.

The liquid then flows through a connecting conduit 23 to a normally-open valve 24, another connecting conduit 26, and a flow sensor 27. Following the flow sensor 27, the liquid flows through an additional conduit 28 connecting to a clean process liquid reservoir 29 where the filtered liquid is stored. Also connected to this conduit 28 through an additional conduit 31, is normally-closed valve 32, and a final conduit 33 connected to a backwash reservoir 34. The backwash reservoir 34 provides a means of storing filtered process liquid for use in the backwash cycle which cleans the filter bed medium.

The backwash reservoir 34 is open with respect to the atmosphere through vent 38 to prevent pressure build-up during filling as well as to prevent creation of a vacuum when liquid is removed for backwashing the filter. A liquid level sensor 36 in the backwash reservoir 34 is attached to the filter controller 54 via wire 109. The filter controller opens valve 32 via wire 110 whenever the backwash reservoir liquid level is low, thus allowing filtered process liquid exiting the filter housing 13 to enter and fill the backwash reservoir 34. When the backwash reservoir 34 is filled, the level sensor 36 indicates to the controller 54 via wire 109 that the reservoir is full, and the controller 54 turns off valve 32 via wire 110 to stop liquid flow into the backwash reservoir 34.

The flow sensor 27 measures the rate of flow of liquid exiting the filter bed. The signal from this sensor is transmitted to the filter controller 54 via wire 112. As the filter accumulates more and more particulates from the liquid stream, the resistance of the bed to liquid flow increases, and the flow of process liquid through the filter lessens (unless the flow of process liquid through the primary pump 7 is increased). At a critical point (defined by the filtration requirements for the process liquid), the flow measured by flow sensor 27 is low enough that the filter must be regenerated by a backwashing process to regain its filtration capacity. This point is identified by having the control system 54 monitor the output of flow sensor 27 via wire 112.

When a backwash operation is required, the normally-open valves in the filter inflow line 9 and in the filter outflow line 24, are closed by the controller via wires 102 and 111, respectively, to prevent continued flow of the liquid through the filter. The normally-closed liquid drain valve 46 and the normally-closed atmospheric vent valve 22 are opened by the controller 54 via wires 103 and 108, respectively. With these valves open, "dirty" liquid drains from the filter housing into the collection reservoir 48 through conduit 11, valve 46 and conduit 47 by gravity flow under atmospheric pressure admitted into the housing through now open vent valve 22.

As the liquid drains into the collection reservoir 48, air enters the filter housing through valve 22 and conduit 21, and the liquid level in the housing drops. When the liquid level reaches the bottom of the filter bed, the bed material (which is lighter than the process liquid, and is thus still pressed against the bed support 16 as it floats on top of the process liquid begins to descend in the filter housing 13 as it floats on the descending top surface of the body of liquid. The liquid level is allowed to fall until the top surface of the filter bed has fallen below the midpoint of the filter housing, as indicated to the controller 54 by the lower fluid level sensor 18 via wire 106. At this point, the controller 54 closes drain valve 46 via wire 103 and the backwash spray process is initiated to clean the filter bed.

In the backwash spray process, clean liquid from the backwash reservoir 34 is withdrawn through conduit 37 by the backwash pump 39, which is turned on by the controller 54 via wire 104, and pumped through the supply conduit 41, normally-closed valve 42 which is now open, and conduit 43, and then sprayed onto the top surface of the now lowered filter bed through single or multiple backwash spray nozzle (s) 44. The number of nozzles 44 is determined by the cross-sectional area of the filter bed and the identity and nature of the filter bed material. A single wide angle, solid cone nozzle with a wide angle of dispersion (e.g., $\geq 90$ degrees can easily backwash a filter housing of up to six to eight inches in diameter. Larger diameter housings, as well as filter beds composed of smaller particles, require multiple spray nozzles for effective backwashing. When the filter bed consists of extremely fine particles, it can compress against the lower surface of the bed support 16 during filtration, thus forming a hard, compressed layer on the surface of the filter bed support. In such cases, it is usually necessary to have one or more additional spray nozzles which spray vertically upward to help dislodge the compressed bed particles and wash them into the lower section of the filter housing 13.

Figure 7:
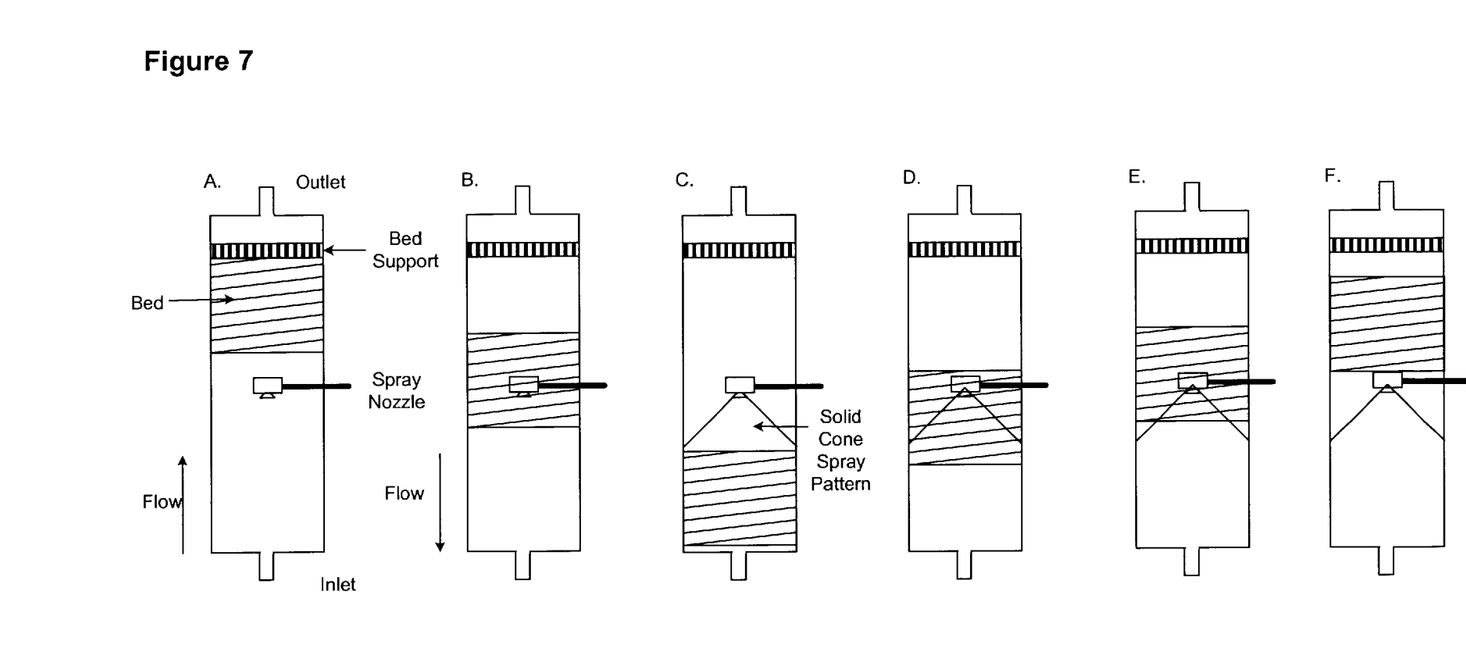
FIG. 7 is a diagrammatic view illustrating the various positional relationships of the filter bed to the backwash spray nozzle during a complete filter and backwash cycle.

As clean liquid is sprayed downward from the backwash nozzle 44, it washes adhering contaminant particulates off each filter particle of the filter bed 14. As this spray drains down through the remaining filter bed material, which is now in its lowermost position, carrying with it the collected contaminants, it accumulates in the bottom of the housing. As this drainage accumulates, the liquid level in the housing rises, because of the continuing backwash process, and the bed (floating on top of the rising fluid) moves upward and past the backwash nozzle 44 which continues to spray clean liquid into the bed, thus continuously washing out the contaminant particulates. Because these contaminant particulates are heavier than either the liquid or the filter bed particles, the fluid spray washes them out of the bed and causes them to sink to the bottom of the filter housing 13. Simultaneously, the filter bed particles, which are lighter than the process liquid continue to float upwards on the rising liquid level in the filter housing.

The backwash spray is continued until the entire filter bed has risen above the nozzle 44, thus ensuring that all of the filter bed particles are cleansed by the spray of clean liquid emitted by the nozzle 44. Level sensor 19 indicates to the controller 54 via wire 107 that the level of liquid in the housing 13 has risen to the appropriate level, and thus indicates that the entire filter bed has been washed in this manner.

When the filter controller 54 receives information from the level sensor 19 that the liquid level is correct, the controller closes valve 42 via wire 105, opens drain valve 46 via wire 103, and thus causes the particulate-laden liquid to once more drain into the collection reservoir 48. This backwash sequence can then be repeated as necessary to ensure the highest level of cleanliness in the filter bed. Once backwashed, the clean filter medium, once again located in the lower end of the filter chamber, is once again ready to filter particulates from the process liquid stream.

To accelerate the removal of contaminated liquid from the bottom of the filter housing, it is possible to add a suction pump or siphon tube (not shown) to the system. Such additions easily make it possible to remove the contaminated process liquid from the housing 13 in thirty seconds or less. After backwashing, the filtration process is again initiated by the controller 54 closing valves 46 and 22 via wires 103 and 108, opening the inlet valve 9 via wire 102 and the outlet valve 24 via wire 111, and pumping liquid from reservoir 2 via the primary fluid pump 7. As process liquid again enters the housing, the filter bed again rises in the filter housing until it encounters the bed support. The filtration process then begins once again as the process liquid begins to flow upwards through the stabilized filter bed and the particulate contaminants begin to be captured by one of the two aforementiond filtration mechanisms.

Figure 4:
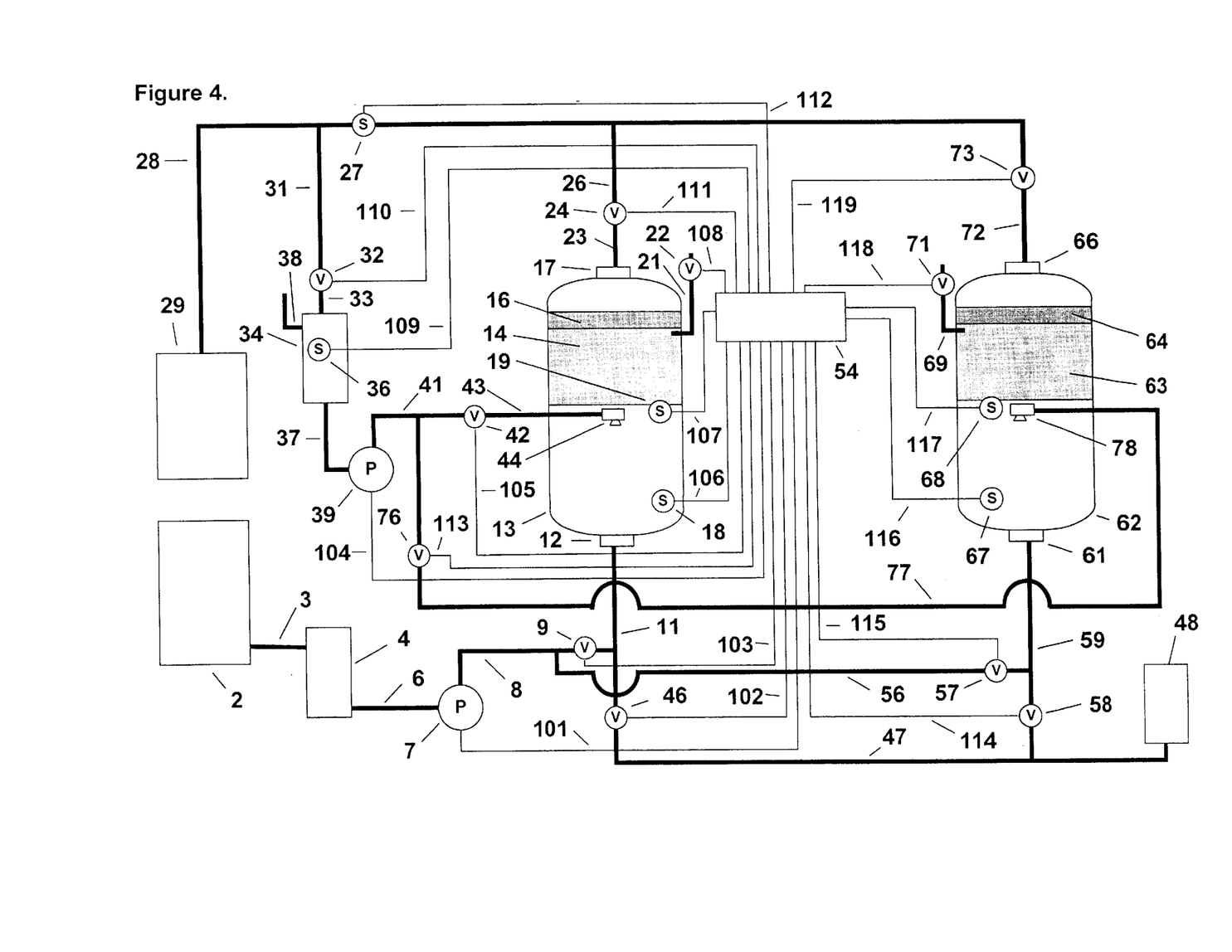
FIG. 4 is a diagrammatic view of the apparatus for filtering particulates from a process liquid utilizing dual filter housings connected in a parallel flow filtration system according to the present invention.

Parallel Filter Housings Embodiment of FIG. 4

Depending on the specific filtration requirements of the process, modifications of the basic single housing filtration system illustrated in FIG. 1 and described above may be required for optimal filtration. In some processes, for example, it is undesirable or virtually impossible to temporarily discontinue operation of the filtration process to clean a filter by backwashing. Thus, in this second embodiment of this filtration system design as illustrated in FIG. 4, two filter housings (containing the same type of bed material) are connected in parallel with one another, so that the filtration system can continue to function without interruption while one of the two filters is being cleaned by backwashing. In this embodiment, the primary and secondary filters may be of equal size or, alternatively, the primary filter may be larger than the secondary filter. In the former case, the two filters may share filtration effort equally, while in the latter case, the secondary filter serves only as a temporary filter to maintain filtration capability during the brief time required to backwash the primary filter.

In this embodiment, a central control system 54 with an embedded microprocessor is used to monitor the sensors installed in the filtration system, and to turn "ON" and "OFF" all of the actuators (pumps and valves) required to operate the system. Although this control system may also be operated manually, due to its increased complexity, the system is much more effectively controlled by an embedded microprocessor. As above, the embedded microprocessor enables more efficient operation of the system as well as providing unattended operating capability for operation during periods when no personnel are available to manually control the system.

In this second embodiment, the flow of the process liquid through the first or primary filter housing 13 follows the sequence described above for the system of FIG. 1. In the interest of brevity in this description, the operational sequence applicable to the embodiment of FIG. 1 is included hereat by reference rather than repeating the sequence.

When backwash of the primary filter 13 is required in this second embodiment, the normally-open valves 9 and 24 in the primary filter inflow line 9 and in the filter outflow line 23, respectively, are closed by the controller 54 via lines 103 and 111, respectively, to prevent continued flow of the liquid through the filter. At the same time, the controller opens normally-closed valves 57 and 73 via wires 115 and 119 to initiate the flow of process liquid through the secondary filter housing 62. The liquid is pumped by the primary pump 7 through conduits 8 and 56 to a now open (but normally-closed) valve 57 and into a connecting conduit 59 which attaches to the secondary filter housing 62 through the filter housing inlet 61.

After passing through the inlet 61 of the secondary filter housing 62, the flowing liquid spreads out and flows upward through the filter housing, causing the filter bed 63, which floats on top of the rising liquid [fluid], to rise in the housing 62. The secondary filter bed 63 is composed of the same particles as the primary filter bed 14. The particles in the secondary filter bed have the same specific size range, density and composition as the particles in the primary filter in order to meet the needs of the filtration process.

As the process liquid flows into the secondary filter housing 62, the level of the process liquid rises in the housing, and the filter bed 63, floating on the rising process liquid, reaches the bed support 64 near the top of the filter housing. As described above in relation to the embodiment of FIG. 1, this support retains the filter bed media, and also provides a final filtration barrier to the particulates carried in the liquid. The filter bed support is nominally formed from the same kind of multi-layer "sandwich" (FIG. 2) described above.

As the process liquid flows vertically upward through the filter bed 63, contaminant particles are retained by the filter bed through surface filtration and depth filtration mechanisms. After flowing through the bed support 64, the rising liquid enters the top portion of the filter housing and exits through the exit port 66. The liquid then flows through a connecting conduit 72 to a normally-closed but now open valve 73, another connecting conduit 26, and the flow sensor 27. From the flow sensor, the liquid flows through an additional conduit 28 connected to the clean process liquid reservoir 29. Also connected to this conduit 28 through an additional conduit 31, normally closed valve 32, and final conduit 33, is the backwash reservoir 34. As the liquid level in the backwash reservoir 34 descends, it is measured by level sensor 36. When the level reaches a predetermined minimum value, the sensor signals the controller 54 through wire 109 to open valve 32 via wire 110. Additional clean liquid is then added to the backwash reservoir 34 through conduit 31, valve 32 and conduit 33. When the liquid level in the backwash reservoir 34 is returned to its normal level, the controller 54 closes valve 32 via wire 110 to stop the flow of liquid into the backwash reservoir 34.

Once the flow of the process liquid has been directed into the secondary filter housing for filtration, the backwash cycle for the primary filter housing 13 can be initiated. The normally-closed liquid drain valve 46 and the normally-closed atmospheric vent valve 22 are opened by the controller 54 via wires 102 and 108. With these valves open, dirty liquid drains from the primary filter housing 13 into the collection reservoir 10 48 through conduit 11, valve 46 and conduit 47.

As the liquid from the primary filter housing 13 drains into the collection reservoir 48 during the backwash cycle, air enters the filter housing through valve 22 and conduit 21, and the liquid level in the housing drops. When the liquid level reaches the bottom of the filter bed, the filter bed material (which is lighter than the process liquid, and thus is still pressed against the filter support 16 as it floats on top of the process liquid) begins to descend in the filter housing 13 as it floats on the top of the receding liquid. The liquid level is allowed to descend until the top of the filter bed has descended below the midpoint of the filter housing. At this point, level sensor 18 signals the controller 54 via wire 106 that the liquid level has dropped to the appropriate level, and the controller closes the drain valve 46 via wire 102 and the backwash spray process is initiated to clean the primary filter bed as previously explained.

After backwashing of the primary filter bed has been completed, the controller re-initiates the filtration process in the primary filter housing by closing valves 46, 22 and 57, via wires 102, 108 and 115, respectively, and by opening the inlet valve 9 and exit valve 24 via wires 103 and 111, and pumping liquid from the reservoir 2 via the primary liquid pump 7. As process liquid again enters the housing, the filter bed rises in the housing and stabilizes when it encounters the bed support structure. The filtration process then begins once again as the process liquid begins to flow upward through the stabilized filter bed.

Once the primary filter has been brought back into filtering operation, the secondary filter 63 contained in the secondary filter housing 62 can be cleaned in the same manner by the backwashing process used for the primary filter. In the case of the secondary filter, the process begins when the controller 54 opens the normally-closed liquid drain valve 58 and the normally-closed atmospheric vent valve 71 via wires 114 and 118. With these valves open, dirty liquid drains from filter housing 62 into the collection reservoir 48 through conduit 59, valve 58 and conduit 47.

As the liquid from the secondary filter housing 62 drains into the collection reservoir 48, air enters the filter housing 62 through valve 71 and conduit 69, and the liquid level in the housing drops. When the liquid level reaches the bottom of the filter bed, the bed material (which is lighter than the process liquid, and thus still pressed against the bed support 64 as it floats on top of the process liquid) begins to descend in the filter housing 62 as it floats on the top of the receding liquid. The liquid level is allowed to descend until the top of the filter bed has fallen below the midpoint of the filter housing, as indicated to the controller 54 by the lower liquid level sensor 67 via wire 116. At this point, the controller closes drain valve 58 via wire 114 and the backwash spray process is initiated to clean the secondary filter bed.

To effectively backwash the secondary filter, clean liquid from the backwash reservoir 34 is again withdrawn through conduit 37 by the backwash pump 39 and pumped through the supply conduit 41, the normally-closed valve 76 which the controller has opened via wire 113, and conduit 77, and is then sprayed onto the filter bed 63 through single or multiple backwash spray nozzle(s) 78. As explained with respect to the FIG. 1 embodiment, the number of nozzles 78 is determined by the cross-sectional area of the filter bed and the identity and nature of the filter bed material. The same backwashing procedure as explained with respect to the FIG. 1 embodiment continues until the entire filter bed has risen above the nozzle 78, allowing all of the bed particles to be cleansed by the spray of clean liquid emitted by the nozzle 78. Level sensor 68 then indicates to the controller via wire 117 when the level of liquid in the housing 62 has risen to the appropriate point, thus indicating that the entire secondary filter bed has been washed of all contaminants and particulate matter. When the controller 54 receives information from level sensor 68 via wire 117 that the liquid level is appropriate, the controller 54 opens the drain valve 58 via wire 114, and the particulate-laden liquid once more drains into the collection reservoir 48. This backwash sequence can then be repeated if necessary to ensure the highest level of cleanliness in the filter bed. The backwashed, clean filter medium is then once again ready to filter particulates from the process liquid stream. To accelerate the removal of contaminated liquid from the bottom of the filter housing, it is possible to add a suction pump or siphon tube (neither shown) to the system. Such additions make it possible to remove the contaminated process liquid from the housing 62 in less than one minute.

Series Filter Housing Embodiment

Figure 5:
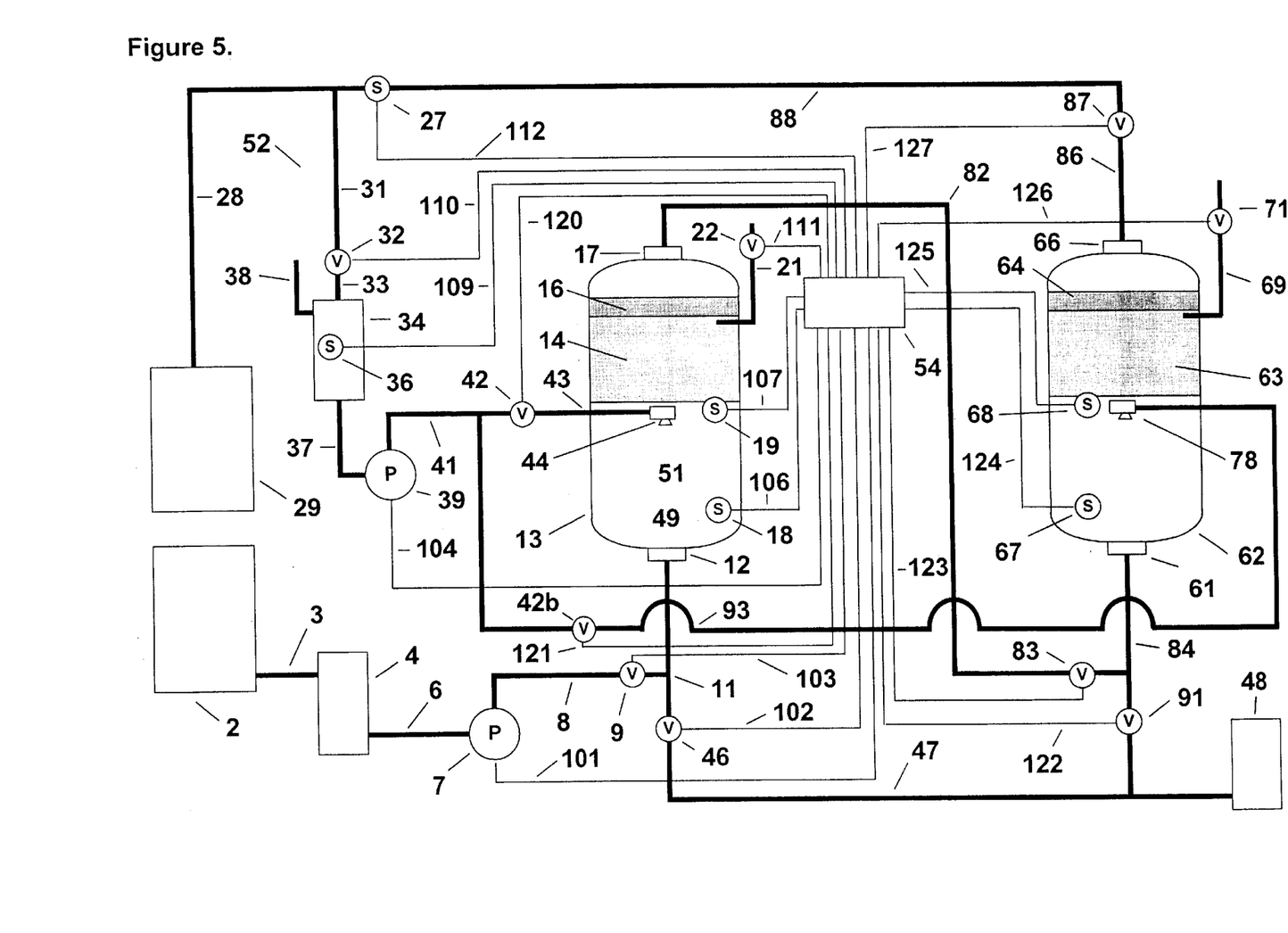
FIG. 5 is a diagrammatic view of the apparatus for filtering particulates from a process liquid utilizing dual filter housings connected in a serial flow filtration system according to the present invention.

In this embodiment, two filter housings are connected in series with one another as illustrated in FIG. 5 to provide a filtration capability which is enhanced over that provided by a single filter. In this embodiment, the filter bed material in the first housing is selected to filter out one or more specific components while the bed material in the second housing is selected to filter out one or more components different from those removed by the first filter. For example, in one specific embodiment, the bed material 14 in the first housing 13 is composed of coarser, larger diameter particles, while the filter bed material 63 in the second housing 62 is composed of finer, smaller diameter particles. This embodiment allows the first filter bed 14 to serve as a "coarse" filter for removing larger contaminant particles, and the second filter bed 63 to serve as a "fine" filter for removing smaller contaminant particles which remain after the process liquid passes through the first bed. By arranging these two filters in series as shown, it is possible to optimize each filter bed for the removal of specific contaminants and thus to maximize the total amount of contaminant removed by the filtration system.

In operation, the process liquid to be filtered is withdrawn from the storage reservoir 2 through conduit 3 to the priming chamber 4, by the vacuum created by the pumping action of the primary pump 7. Alternatively, the liquid may also be withdrawn directly from a process liquid stream. The liquid then passes from priming chamber 4 through conduit 6 to the primary liquid pump 7, by which it is pumped through conduit 8, to the normally open inlet valve 9, and into the connecting conduit 11. Through the connecting conduit 11 in turn, the liquid is pumped into the first filter housing 13 through the filter housing inlet 12 as previously described in relation to the FIG. 1 embodiment.

In this embodiment, as in the previous embodiments, after passing through the inlet 12, the flowing liquid spreads out and flows upward through the filter housing, causing the filter bed 14, which floats on top of the rising liquid, to rise in the housing 13. The first filter bed is composed of particles having a specific gravity lower than that of the liquid being filtered, and selected to be within a specific size range, i.e., between 0.5 and 1.0 mm for a "coarse" filter. As with the other embodiments, the size and composition of the filter bed particles, as well as the bed volume and filtration area, are determined by the specific process liquid filtration requirements, including the size and nature of the particulates to be removed from the process liquid. The particles which compose the filter bed are typically formed from plastic, glass or ceramic materials, but in any event these particles must have a specific gravity less than that of the liquid being filtered.

As previously described with respect to the other embodiments, the level of the process liquid rises in the housing 13, the filter bed 14, which is floating on the rising process liquid, rises until it touches the bed support 16 adjacent the top of the filter housing. This support retains the bed media, and prevents it both from rising any further and from flowing out of the filter housing along with the liquid being filtered. The bed support 16 also provides a final filtration barrier to the particulates carried in the liquid. As described above, the bed support is nominally formed from a multi-layer sandwich (FIG. 2), consisting of a perforated metal plate 16(A), and two or more layers of screen 16(B) and 16(C) or alternatively, a layer of screen 16(B) and a layer of semipermeable membrane or sintered permeable plastic or metal material 16(C).

Selection of these constituent layers depends upon the size of the filter bed particles. The fine mesh screen or membrane layer is positioned adjacent the lower face of the bed support 16 immediately next to the filter bed media, a medium mesh screen is positioned in the center to provide structural support for the fine layer, and the perforated metal is last and provides structural stiffening. The fine material, whether screen or permeable membrane is always the layer which directly contacts the top of the filter bed media. The other layers serve to provide structural support and enhance liquid flow through the bed support. This multiple layer design provides the strength necessary to retain the bed media under working filtration pressures which may be as high as 75–150 psi as previously described.

As the process liquid flows vertically upward through the filter bed 14, contaminant particles are retained by the filter bed through two different mechanisms previously discussed. At the point where the process liquid flow first encounters the filter bed, surface filtration, the first mechanism, occurs. This mechanism occurs as the larger particulates are captured at the filter bed's lower surface, being unable to pass through the spaces between the particles which make up the filter bed as the liquid flows up through the bed. As these larger particulates are captured at the lower surface of the filter bed, they form a crust on that surface.

Flowing along with the process liquid, smaller particulates may be captured at the bottom surface of the filter, retained by the crust formed by the accumulation of larger particulates. Thus, this crust may by itself prevent the passage of some of the smaller particulates. Alternatively, the smaller particulates may pass through the crust on the filter bed's lower surface, penetrate the bed, and become trapped by the second mechanism, namely, depth filtration, which captures and retains the smaller particles in the interstitial spaces between the filter media particles forming the bed. The smallest particulates will pass through the crust on the first filter bed's lower surface, the bed itself and the bed restraint structure 16. These particulates will then flow with the liquid out of the filter through the filter housing outlet 17, conduit 82, the normally-open inlet valve 83 for the second filter bed, conduit 84, and finally into the second filter housing 62 through the housing inlet 61.

After passing through the inlet 61, the flowing liquid spreads out, and flows vertically upward through the filter housing 62, causing the filter bed 63, which floats on top of the rising fluid, to rise in the housing 62. The second filter bed is composed of smaller diameter particles than the first filter bed (i.e., 0.05 to 0.1 mm). The second filter bed particles are selected to be within the specific size range and composition to meet the specific needs of the filtration process as well as having a specific gravity lower than that of the liquid being filtered.

As the process liquid flows into the filter housing 62, the level of the process liquid rises in the housing, and the bed 63, floating on the rising process liquid, reaches the bed support 64 adjacent the top of the filter housing. As described above, this support retains the bed media, and also provides a final filtration barrier to the particulates carried in the liquid. The bed support is nominally formed from the same kind of multi-layer sandwich previously discussed and illustrated in FIG. 2.

As the process liquid flows vertically upward through the filter bed 63, the smallest contaminant particles are retained by the second filter bed 63 through both surface filtration and depth filtration mechanisms. After flowing through the bed support 64, the liquid enters the top of the filter housing and exits through the exit port 66. The liquid then flows through a connecting conduit 86 to a normally-open valve 87, another connecting conduit 88, and a flow sensor 27. From the flow sensor, the liquid flows through an additional conduit 28 which connects to a clean process liquid reservoir 29. Also connected to this conduit 28 through an additional conduit 31, normally-closed valve 32, and final conduit 33, is the backwash reservoir 34. As the liquid level in the backwash reservoir 34 recedes and is sensed by level sensor 36, the sensor signals the controller 54 via wire 109 and the controller adds clean liquid to the reservoir 34 by opening normally-closed valve 32 via wire 110. When the liquid level in the backwash reservoir 34 is sufficient, the level sensor 36 signals the controller 54 via wire 109 and the controller closes valve 32 via wire 110 to stop the flow of liquid into the reservoir 34.

The backwash process in this embodiment is to clean each bed individually, routing the dirty liquid from both filters into the collection tank 48. When backwash operation is required in this embodiment, the controller 54 closes the normally-open valves in the first filter inflow line 9, in the second filter inflow line 83, and in the filter outflow line 87 via wires 103, 123 and 127, respectively, to prevent continued flow of the liquid through the filters. The controller opens the normally-closed liquid drain valve 46 and the normally-closed atmosphere vent valves 22 via wires 102 and 111. With these valves open, dirty liquid drains from the first filter housing 13 into the collection reservoir 48 through conduit 11, valve 46 and conduit 47. As the liquid from the first filter housing 13 drains into the collection reservoir 48, air enters the filter housing through valve 22 and conduit 21, and the liquid level in the housing drops. When the liquid level reaches the bottom of the bed, the bed material (which has a specific gravity less than the process fluid, and thus is still pressed against the retaining screen 16 as it floats on top of the process liquid) begins to descend in the filter housing 13 as it floats on the top of the receding liquid. The liquid level is allowed to recede until the top of the filter bed has descended below the midpoint of the filter housing, which fact is indicated to the controller 54 by the lower liquid level sensor 18 via wire 106. At this point, the controller 54 closes the drain valve 46 via wire 102 and the backwash process is initiated to clean the filter bed.

In the backwash process for this embodiment of the invention, clean liquid from the backwash reservoir 34 is withdrawn through conduit 37 by the backwash pump 39 and pumped through the supply conduit 41, the normally-closed valve 42a which the controller 54 has now opened via wire 120, and conduit 43 and then sprayed clean liquid onto the bed through single or multiple backwash spray nozzle(s) 44. The number of nozzles 44 is determined by the cross-sectional area of the filter bed and the identity of the bed material. A single wide angle solid cone nozzle with a wide angle of dispersion (e.g. 90 degrees) can easily backwash a filter bed contained in a housing of up to six to eight inches in diameter. Larger diameter housings and smaller particle filter beds require multiple liquid spray nozzles for effective backwashing. When the bed consists of extremely small particles, which may compress during filtration, it may be necessary to have one or more additional spray nozzles spray vertically upwardly to help dislodge the compressed bed particles and wash them into the lower section of the filter housing 13.

As clean liquid is sprayed downward from the nozzle 44, it washes adhering contaminant particulates off each particle of the filter bed 14. As this sprayed liquid drains down through the remaining bed material, carrying with it the collected contaminants and any additional contaminants that become entrained in the liquid along the way, it accumulates in the bottom of the housing. As it accumulates, the liquid level in the housing rises, and the bed (floating on top of the liquid) rises in the housing. As the bed rises, the bed particles move upward in the housing, moving the bed particles past the backwash nozzle 44, which is now essentially embedded in the filter bed, and which continues to spray clean liquid into the bed, thus continuously washing out of the filter bed the contaminant particulates.

Because these contaminant particulates are heavier than either the liquid or the bed particles, the liquid spray washes them out of the bed and causes them to sink to the bottom of the filter housing. Simultaneously, the filter bed particles, which are lighter than the process liquid, continue to float upwards on the rising liquid level in the filter housing. The backwash spray is continued until the entire bed has risen above the nozzle, allowing all of the bed particles to be cleansed by the spray of clean liquid emitted by the nozzle 44. Level sensor 19 indicates to the controller 54 through wire 107 that the level of liquid in the housing 13 has risen to the highest appropriate level, thus indicating that the entire bed has been washed in this fashion and that the filter bed now is positioned in the top portion of the filter housing above the body of contaminated liquid.

When the filter controller receives the signal from level sensor 19 that the level is appropriate, the controller 54 opens drain valve 46 via wire 102, and the particulate-laden contaminated liquid drains into the collection reservoir 48. Such draining may be effected by gravity induced flow, or a suction pump or siphon tube may be utilized to totally drain the contaminated liquid in less than one minute, causing the filter bed to descend in the housing as the contaminated liquid recedes. This backwash sequence can then be repeated as necessary to ensure the highest level of cleanliness in the filter bed. After the backwash process is completed, the controller 54 closes normally-closed valves 22 and 46 via wires 111 and 102. Once backwashed, the clean filter medium is then again ready to filter particulates from the process liquid stream.

After the first filter bed 14 is backwashed, the second filter bed 63 backwash operation is performed. To backwash the second filter bed, the controller keeps the normally-open valves in the filter inflow line 83 and in the filter outflow line 87 closed to prevent continued flow of the liquid through the filter. The controller then opens the normally-closed liquid drain valve 91 and the normally-closed atmospheric vent valve 71 via wires 122 and 126. With these valves open, dirty liquid drains from filter housing 62 into the collection reservoir 48 through conduit 84, valve 91 and conduit 47. As the liquid from the secondary filter housing 62 drains into the collection reservoir 48, air enters the filter housing through valve 71 and conduit 69, and the liquid level in the housing drops.

When the liquid level reaches the bottom of the bed, the bed material begins to descend in the filter housing 62 as it floats on the top of the receding liquid. The liquid level is allowed to fall until the top of the filter bed has descended below the midpoint of the filter housing, as indicated to the controller 54 by the lower liquid level sensor 67 via wire 124. At this point, the controller closes drain valve 91 via wire 122 and the backwash process is initiated to clean the filter bed.

In the backwash process, clean liquid from the backwash reservoir 34 is withdrawn through conduit 37 by the backwash pump 39 and pumped through the supply conduit 41, the normally-closed valve 42b which the controller has now opened via wire 121, and conduit 93 and then sprayed onto the bed through single or multiple backwash spray nozzle(s) 78. The number of nozzles 78 is determined by the cross-sectional area of the filter bed and the identity of the bed material. When the bed consists of extremely small particles, which may compress during filtration, it may be necessary to have one or more additional spray nozzles spray vertically upward to help dislodge the compressed bed particles and wash them into the lower section of the filter housing 62.

As clean liquid is sprayed downward from the nozzle 78, it washes adhering contaminant particulates off each particle of the filter bed 63. As this sprayed liquid drains down through the remaining bed material, carrying with it the collected contaminants, it accumulates in the bottom of the housing. As it accumulates, the liquid level in the housing rises, and the bed (floating on top of the liquid) rises in the housing. As the bed rises, the bed particles move upward in the housing, moving the bed particles past the backwash nozzle 78 which continues to spray clean liquid into the bed, thus continuously washing out the contaminant particulates and causing them to sink to the bottom of the filter housing 62. Simultaneously, the filter bed particles, which are lighter than the process liquid, continue to float upward on the rising liquid level in the filter housing. The backwash spray is continued until the entire bed has risen above the nozzle, allowing all of the bed particles to be cleansed by the spray of clean liquid emitted by the nozzle 78. Level sensor 68 indicates to the controller 54 through wire 125 that the level of liquid in the housing 62 has risen to the appropriate level, thus indicating that the entire bed has been washed in this fashion and now lies above the contaminated body of liquid. When the filter controller receives information from the level sensor 68 that the level of the contaminated liquid is appropriate, it opens drain valve 91 via wire 122, and all the particulate-laden liquid once more drains into the collection reservoir 48. This backwash sequence can then be repeated as necessary to ensure the highest level of cleanliness in the filter bed. The backwashed, clean filter medium is then again ready to filter particulates from the process liquid stream.

After backwashing of both filter beds 14 and 63 is completed, the filtration process is again initiated when the controller 54 closes valves 91 and 71 via wires 122 and 126, opens the inlet valves 9 and 83 and exit valve 87 via wires 103, 123 and 127, respectively, and pumps liquid from the reservoir 2 via the primary fluid pump 7. As process liquid again enters the housings, the filter beds rise in the housings and stabilize when they encounter their respective filter bed restraint structures. The filtration process then begins once again as the process liquid begins to flow upward through the stabilized filter beds.

Filtration of Dissolved Metals

Figure 6:
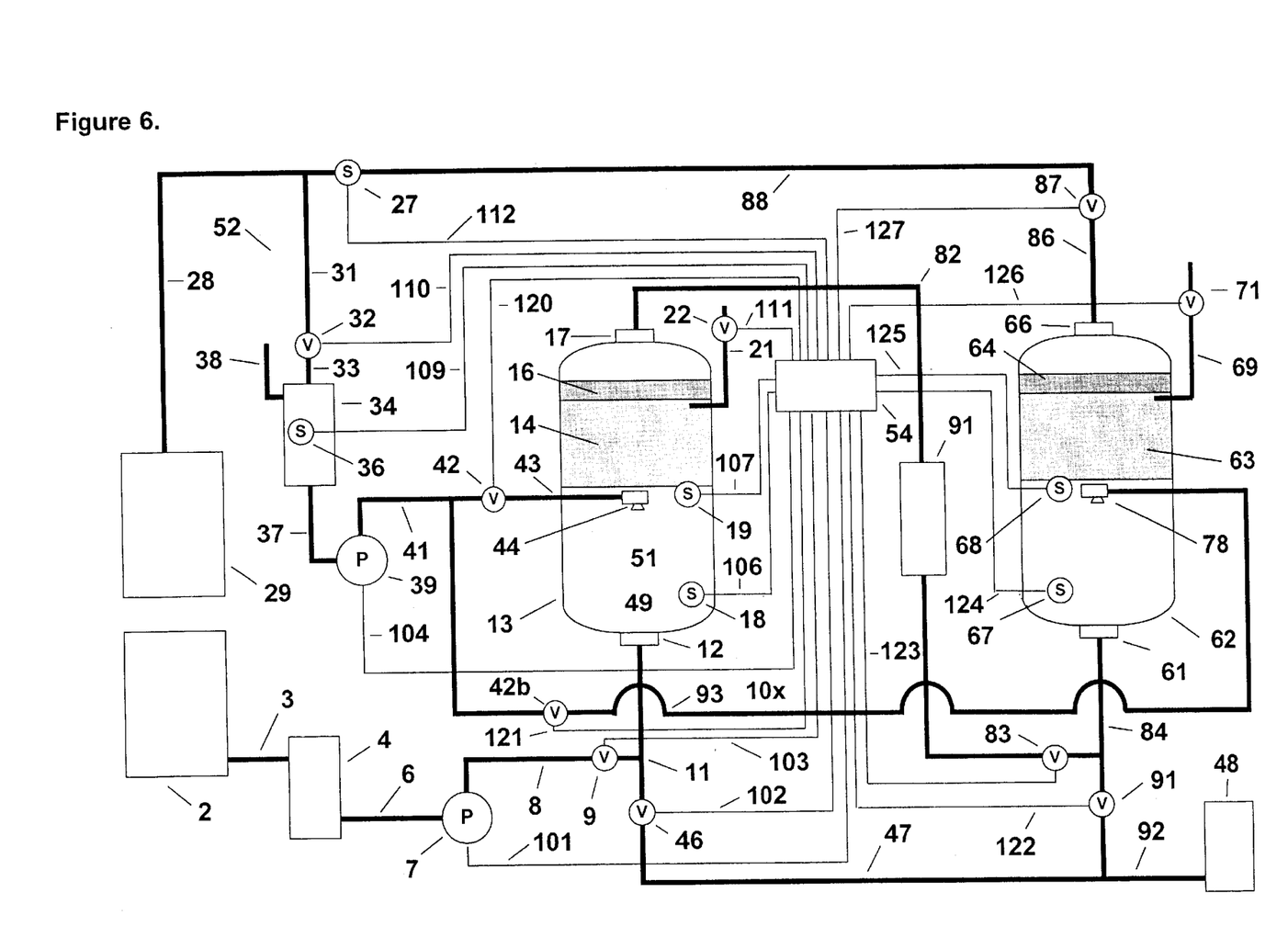
FIG. 6 is a diagrammatic view of the filtration apparatus incorporating an intermediate hydroxyl ion-generating reactor which functions to precipitate dissolved metal ions prior to flowing through the filter bed to enable filtering precipitates thereof from a process liquid utilizing the dual filter, serial flow filtration system illustrated in FIG. 5.

In this embodiment, illustrated diagrammatically in FIG. 6, two filter housings 13 and 62 are arranged in series as described above with respect to FIG. 5, and function by a unique method of chemical precipitation of dissolved, ionized metals in the aqueous solutions, followed by filtering of and removal of the precipitated particulates from the process liquid with a particulate filter as previously discussed. This is in contrast to dissolved metals [are] conventionally precipitated in a liquid containing them by the direct addition of basic solutions (e.g., lime, sodium hydroxide, potassium hydroxide) which provide the required hydroxyl ions for initiation of the precipitation reaction. This addition of basic solutions is usually accomplished conventionally by using a metering pump to inject precise amounts of the basic solution into the process liquid stream as it enters a reactor, which serves to ensure sufficient mixing for the metal hydroxides to form and precipitate. These precipitates are subsequently captured by a particulate filtration system.

The advantage of the metals removal system described herein, in contrast to the conventional method described above, is that no basic solutions need be added to cause the precipitation. Instead, the hydroxyl ions are generated directly In the process liquid by pumping the liquid through an ultraviolet radiation reactor. This ultraviolet radiation forms hydroxyl ions in the metal-containing aqueous solution. These hydroxyl ions chemically combine with the ionized metals and cause them to precipitate and form particulates. These particulates are then removed from the aqueous solution by the filter bed filtration embodiments described herein.

A diagram of a system to effect this type of precipitation is presented in FIG. 6. The diagram presented in this figure illustrates a pair of filter beds connected in series as described above and illustrated in FIG. 5. In FIG. 6, however, an ultraviolet reactor 91 has been added to the system to process aqueous solution exiting from the first (coarse) filter housing 13. Except for the addition of the ultraviolet reactor 91, the structure and operation of the system of FIG. 6 is in all respects similar to the structure and operation of the system illustrated in FIG. 5 and described hereinabove. Accordingly, in the interest of brevity in this description, the operation of the system of FIG. 6 will not be described in detail and the description of the system illustrated in FIG. 5 is incorporated hereat by reference. In this embodiment, suffice to say that both the smallest particulate and the dissolved metals will flow with the liquid out of the filter housing 13 through the filter housing outlet 17 and will proceed through conduit 82.

The aqueous process liquid then flows through an ultraviolet (UV) exposure reactor 91, where it is exposed to a high flux of UV radiation. The UV radiation induces the formation of hydroxyl ions in the liquid, which subsequently combine with the ionized metals in the solution to form insoluble precipitate particles. The liquid then flows out of the UV exposure reactor 91, through the normally-open inlet valve 83 for the second filter bed, conduit 84, and into the second filter housing 62 through the housing inlet 61. The process liquid, now bearing the insoluble precipitated particles passes upward through the filter bed 63 in the second filter housing 62 as previously described.

While the invention has been described as having specific embodiments, it will be understood that it is capable of further modification. The disclosure herein is therefore intended to cover any variations, uses, or adaptations of the invention as come within the scope of the appended claims. Accordingly, having described the invention, what is believed to be new and novel and sought to be protected by letters patent is as follows.

I claim:

1. A process liquid filtration apparatus for removing particulates from a flowing process liquid having a predetermined specific gravity, comprising:

a) a source of said particulate laden process liquid;

b) a filter chamber having an inlet port for receiving said particulate laden process liquid and an outlet port for discharging filtered process liquid therefrom;

c) a composite filter bed within said filter chamber formed by distinct filter particles having a specific gravity lower than the said predetermined specific gravity of said process liquid;

d) means for conveying particulate laden process liquid into said filter chamber from said source thereof for passage through said composite filter bed for separation of said particulates from said process liquid and discharge of filtered process liquid through said outlet port of said filter chamber;

e) means communicating with said outlet port for conveying said filtered process liquid away from said filter chamber for re-use as a non-contaminated process liquid;

f) at least one backwash spray head mounted within said filter chamber;

g) means connecting said at least one backwash spray head to the outlet port of said filter chamber to convey filtered process liquid from said filter chamber to said at least one backwash spray head;

h) means interposed in said means connecting said at least one spray head to said filter chamber selectively operable to initiate conveyance of said filtered process liquid to said at least one spray head in response to a reduced flow rate when said filter bed is so clogged by particulates that the rate of flow of said filtered process liquid drops below a selected predetermined flow rate, whereby said filter bed is backwashed to remove said particulates therefrom; and i) said means responsive to said reduced flow rate from said filter chamber includes a sensor that measures said flow rate, a plurality of solenoid valves, a filtered process liquid reservoir, a pump and an electronic control system interconnecting said sensor, valves reservoir and pump.

2. A process liquid filtration apparatus for removing particulates from a process liquid having a predetermined specific gravity, comprising:

a) a source of said particulate laden process liquid;

b) a filter chamber having an inlet port for receiving said particulate laden process liquid and an outlet port for discharging filtered process liquid therefrom;

c) a composite filter bed within said filter chamber formed by distinct filter particles having a specific gravity lower than the said predetermined specific gravity of said process liquid;

d) means for conveying particulate laden process liquid into said filter chamber from said source thereof for passage through said composite filter bed for separation of said particulates from said process liquid and discharge of filtered process liquid through said outlet port of said filter chamber;

e) means communicating with said outlet port for conveying said filtered process liquid away from said filter chamber for re-use as a non-contaminated process liquid;

f) dual filter chambers connected in a series flow filtration system configuration wherein a first of said filter chambers is the primary filter chamber and a second of said filter chambers is the secondary filter chamber;

g) wherein said outlet port of said primary filter chamber is connected to the inlet port of said secondary filter chamber, the outlet port of said secondary filter chamber is selectively connected to deliver filtered process liquid to said primary and secondary filter chambers to effect backwashing of the composite filter beds in said dual filter chambers, and an electronic control system is provided interconnecting said series flow filter chambers whereby the filter beds in said series-connected filter chambers may be composed of particles sized to filter coarse particulates from process liquid passing through said primary filter chamber and composed of particles sized to filter finer particulates from the process liquid admitted to said secondary filter chamber to thus maximize the total amount of contaminant particulates removed by said process liquid filtering apparatus; and h) wherein a hydroxyl ion-generating ultraviolet reactor is interposed between said primary and secondary filter chambers, said filtered process liquid discharged from said primary chamber flows through said ultraviolet reactor and is exposed to a high flux of ultraviolet radiation flowing therethrough to induce the formation of hydroxyl ions in the process liquid that combines with ionized metals in the process liquid to form insoluble precipitate particles that flow into the secondary filter chamber to be captured by said composite filter bed and filtered from the process liquid flowing through said secondary filter chamber.

3. A process liquid filtration apparatus for removing particulates from a flowing process liquid having a predetermined specific gravity, comprising:

a) a source of said particulate laden stream of flowing process liquid;

b) a filter chamber having an inlet port for receiving said particulate laden stream of flowing process liquid and an outlet port for discharging filtered process liquid therefrom;

c) a composite filter bed within said filter chamber movable by said process liquid from a first unrestrained position in said chamber to a second restrained position in said chamber and formed by distinct filter particles having a specific gravity sufficiently lower than the said predetermined specific gravity of said process liquid so that the filter bed floats on the surface of the process liquid between said first and second positions;

d) means for conveying particulate laden process liquid into said inlet port of said filter chamber from said source thereof for passage through said composite filter bed for separation of said particulates from said flowing process liquid and discharge of filtered process liquid through said outlet port of said filter chamber;

e) means communicating with said outlet port for conveying said filtered process liquid away from said filter chamber for re-use as a non-contaminated process liquid;

f) at least one backwash spray head mounted within said filter chamber;

g) means connecting said at least one backwash spray head to the outlet port of said filter chamber to convey filtered process liquid from said filter chamber to said at least one backwash spray head;

h) means interposed in said means connecting said at least one spray head to said filter chamber and including means responsive to a reduced flow rate of said filtered process liquid and selectively operable to divert conveyance of said filtered process liquid to said at least one spray head when said filter bed is so clogged by particulates that the rate of flow of said filtered process liquid drops below a selected predetermined flow rate, whereby said filter bed is backwashed by filtered process liquid to remove said particulates therefrom; and i) wherein said means responsive to said reduced flow rate from said filter chamber includes a sensor that measures said flow rate, a plurality of solenoid operated valves, a filtered process liquid reservoir, a pump and an electronic control system interconnecting said sensor, valves, reservoir and pump.

4. A process liquid filtration apparatus for removing particulates from a flowing process liquid having a predetermined specific gravity, comprising:

a) a source of said particulate laden stream of flowing process liquid;

b) a filter chamber having an inlet port for receiving said particulate laden stream of flowing process liquid and an outlet port for discharging filtered process liquid therefrom;

c) a composite filter bed within said filter chamber movable by said process liquid from a first unrestrained position in said chamber to a second restrained position in said chamber and formed by distinct filter particles having a specific gravity sufficiently lower than the said predetermined specific gravity of said process liquid so that the filter bed floats on the surface of the process liquid between said first and second positions;

d) means for conveying particulate laden process liquid into said inlet port of said filter chamber from said source thereof for passage through said composite filter bed for separation of said particulates from said flowing process liquid and discharge of filtered process liquid through said outlet port of said filter chamber;

e) means communicating with said outlet port for conveying said filtered process liquid away from said filter chamber for re-use as a non-contaminated process liquid;

f) wherein said filter chamber comprises a first of dual filter chambers connected in a series flow filtration system configuration wherein said first of said filter chambers is the primary filter chamber and the second of said filter chambers is the secondary filter chamber;

g) wherein the outlet port of said primary filter chamber is connected to the inlet port of said secondary filter chamber, the outlet port of said secondary filter chamber is selectively connected to deliver filtered process liquid to said primary and secondary chambers to effect backwashing of the composite filter beds in said dual chambers;

h) an electronic control system interconnecting said series-connected flow primary and secondary filter chambers whereby the filter beds in said series-connected filter chambers may be composed of particles sized to filter course particulates from process liquid passing through said primary filter chamber and composed of particles sized to filter finer particulates from then process liquid passing through said secondary filter chamber to thus maximize the total amount of contaminant particulates removed by said process liquid filtration apparatus; and i) a hydroxyl ion-generating ultraviolet reactor interposed between said primary and secondary filter chambers, said filtered process liquid discharged from said primary filter chamber flows through said ultraviolet reactor and is exposed to a high flux of ultraviolet radiation in flowing therethrough to induce the formation of hydroxyl ions in the process liquid that combine with ionized metals in the process liquid to form insoluble precipitate particles that flow into the secondary filter chamber to be captured by said composite filter bed and filtered from the process liquid flowing through said secondary filter chamber.

* * * * *